(12) United States Patent
Connolly

(10) Patent No.: US 8,989,826 B1
(45) Date of Patent: Mar. 24, 2015

(54) CELLULAR PHONE CASE AND STORAGE ACCESSORY

(76) Inventor: Linda Connolly, New Fairfield, CT (US)

(*) Notice: Subject to any disclaimer, the term of this patent is extended or adjusted under 35 U.S.C. 154(b) by 534 days.

(21) Appl. No.: 13/374,162

(22) Filed: Dec. 15, 2011

Related U.S. Application Data

(63) Continuation-in-part of application No. 12/803,356, filed on May 21, 2010, now abandoned.

(51) Int. Cl.
*H04M 1/00* (2006.01)

(52) U.S. Cl.
USPC ............... 455/575.8; 455/575.1; 455/90.3; 361/679.01; 361/679.3

(58) Field of Classification Search
CPC ... H04B 1/3888; H04B 1/3816; H04M 1/021; H04M 1/0214; H04M 1/0249; H04M 1/23; H04M 1/0279; H04M 1/185; H04M 1/0247; H04M 1/0283; H04M 1/0225; H04M 1/0252; H04M 1/026; H04M 1/022; H04M 1/0222; G06F 2200/1633; H05K 5/0243; H05K 5/0239; H01H 2219/006; H01H 2221/08; A45D 40/222; G09G 2300/026; H01R 13/447
USPC ............. 361/679.01, 679.19, 679.27, 679.28, 361/679.3; 455/575.1–575.4, 575.8, 550.1, 455/90.1, 90.3
See application file for complete search history.

(56) References Cited

U.S. PATENT DOCUMENTS

| | | | |
|---|---|---|---|
| D379,262 S | 5/1997 | Seigel | |
| 6,201,867 B1 | 3/2001 | Koike | |
| 6,729,518 B2 | 5/2004 | Badillo et al. | |
| D501,990 S | 2/2005 | Carr | |
| D525,781 S | 8/2006 | Arney et al. | |
| 7,204,398 B1 | 4/2007 | Smith, Sr. | |
| D565,840 S | 4/2008 | Kwak | |
| D567,500 S | 4/2008 | Kwak et al. | |
| D582,405 S | 12/2008 | Andre et al. | |
| D602,689 S | 10/2009 | Hewitt | |
| D619,356 S | 7/2010 | Hillman | |

(Continued)

FOREIGN PATENT DOCUMENTS

| | | |
|---|---|---|
| CN | 2622961 Y | 6/2002 |
| CN | 2641939 Y | 9/2004 |

(Continued)

OTHER PUBLICATIONS

Cocoon Case—retail product photograph and copy of packaging.

(Continued)

*Primary Examiner* — Sujatha Sharma
(74) *Attorney, Agent, or Firm* — Kyle S. Brant

(57) ABSTRACT

A cellular phone case accessory device is disclosed. The case is attached to a cell phone and includes an upper section and a lower section sized to correspond with a cellular phone and to receive the phone in one of the sections. The upper section and lower section are attached by a hinge that enables pivotal movement of the upper and lower sections with respect to each other. Situated within the space defined between the upper and lower sections is a pocket or storage compartment where credit cards, cash, ID and other items may be stored safely. A mirror is also disposed between the upper and lower sections and usable when the upper and lower sections are pivotally disposed in an open position. Another embodiment includes a cell phone holding compartment comprised of two portions removably attached to one another for inserting and retaining a cell phone therein.

15 Claims, 12 Drawing Sheets

(56) References Cited

U.S. PATENT DOCUMENTS

| | | | |
|---|---|---|---|
| 8,164,891 B2* | 4/2012 | Liu | 361/679.32 |
| 8,457,701 B2* | 6/2013 | Diebel | 455/575.8 |
| 8,504,127 B2* | 8/2013 | Altschul et al. | 455/575.8 |
| 8,554,289 B2* | 10/2013 | Ogatsu | 455/575.4 |
| 2002/0017545 A1 | 2/2002 | Badillo et al. | |
| 2004/0018863 A1* | 1/2004 | Engstrom et al. | 455/575.8 |
| 2005/0255898 A1 | 11/2005 | Huang | |
| 2005/0279655 A1* | 12/2005 | Chen | 206/307.1 |
| 2007/0223183 A1 | 9/2007 | Oja | |
| 2008/0121322 A1 | 5/2008 | Thomson | |
| 2010/0065454 A1 | 3/2010 | Badillo et al. | |
| 2011/0077061 A1* | 3/2011 | Danze et al. | 455/575.1 |
| 2011/0089078 A1 | 4/2011 | Ziemba | |
| 2011/0294542 A1 | 12/2011 | Ray et al. | |
| 2011/0294556 A1* | 12/2011 | Carlberg et al. | 455/575.8 |
| 2012/0244918 A1* | 9/2012 | Hall | 455/575.4 |
| 2013/0271897 A1* | 10/2013 | Limber et al. | 361/679.01 |
| 2014/0051458 A1* | 2/2014 | Khosla | 455/456.1 |
| 2014/0360898 A1* | 12/2014 | Kantor et al. | 206/216 |

FOREIGN PATENT DOCUMENTS

| | | | |
|---|---|---|---|
| KR | 10-2008-0006665 | | 1/2008 |
| KR | 10-2009-0068836 | | 6/2009 |
| KR | 2014004706 | * | 8/2014 |

OTHER PUBLICATIONS iPhone Fastback Case—retail product from Sharper Image, Web Site product printout (web page is no longer available).

ilid iphone 4 wallet case http://www.ilidiphonecase.com/products/ilidmk-1 ; web page printout.

* cited by examiner

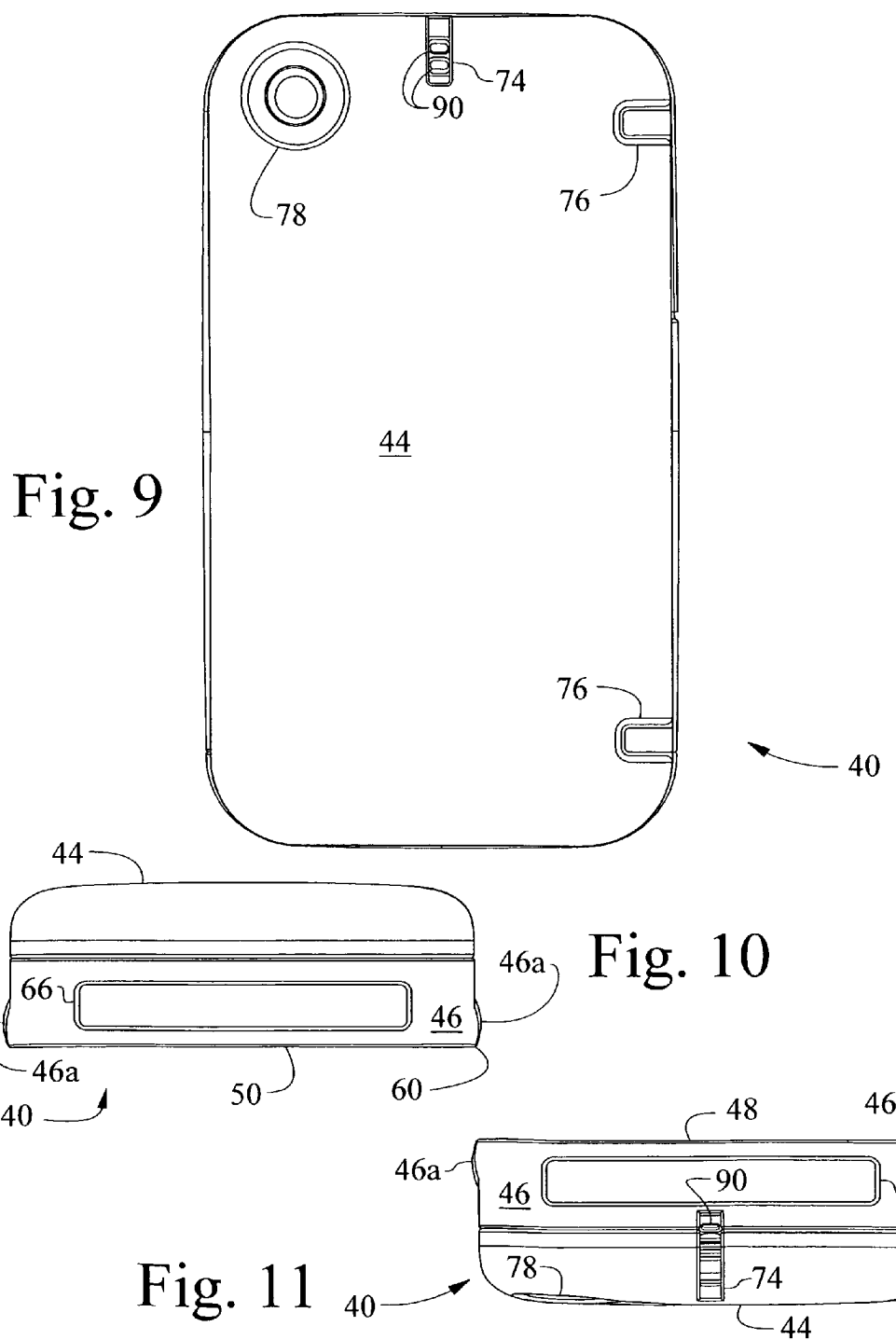

US 8,989,826 B1

CELLULAR PHONE CASE AND STORAGE ACCESSORY

RELATED U.S. APPLICATION DATA

This application is a continuation-in-part of Ser. No. 12/803,356 filed May 21, 2010 now abandoned and titled Cellular Phone Case And Storage Accessory.

FIELD OF THE INVENTION

The present invention relates to the cellular phone accessory industry. This product is designed to act as a phone case, wallet, and miscellaneous card holder with mirror. It is a full-functioning hinged case with slotted compartment for currency, business cards, credit cards, driver's license and any other like items, with a concealed mirror.

BACKGROUND OF THE INVENTION

The invention will be an everyday useful item relevant to the fashion/utility industry of the cell phone. Since most people carry a cell phone, it can act as a pocket and also allow people to minimize the bulkiness of a wallet.

Even though there are multiple cell phone accessories and cases, none specifically pinpoint the needs of a wallet and phone protection in one application.

SUMMARY OF THE INVENTION

The present invention provides a protective covering of the cell phone along with an attached hinged compartment specifically designed to act as a wallet/ID holder. Its design function is to be non cumbersome and sleek for today's modern lifestyle and convenient storage of the cell phone when not needed.

A cell phone case for use with a cell phone having a display, a substantially rectangular housing having a height, width and depth, and a plurality of buttons and connectors situated about the periphery of the housing, said cell phone case, according to one aspect of the present invention, comprises a substantially planar rectangular member conforming in size to the height and width dimensions of the cell phone housing, said rectangular member including resilient retaining walls extending substantially perpendicularly from each edge of said rectangular member and extending inwardly over said rectangular member at a distance corresponding to the depth of the cell phone case and wherein said resilient retaining walls grip the cell phone in position when the cell phone is situated between the resilient retaining walls, said retaining walls including a plurality of apertures therein enabling access to the plurality of buttons and connectors of the cell phone when the cell phone is situated within said resilient retaining walls, a hinge attached to said rectangular member, a five-sided rectangular box having an open side and attached to said hinge so that said open side of said box is disposed toward said rectangular member, said box being pivotable on said hinge with respect to said rectangular member, said rectangular box defining a storage compartment with said rectangular member, a mirror disposed within said storage compartment, and retention means situated within said storage compartment for retaining cash, credit cards, business cards and ID cards therein.

One object of the present invention is to provide an improved cell phone case.

Another object of the present invention is to provide a cell phone case including a hinged storage compartment for secure storage of money and credit cards therein.

Still another object of the present invention is to provide a cell phone case including a mirror that is protected from external damage.

These and other objects of the present invention will become more apparent from the following description of the preferred embodiments.

BRIEF DESCRIPTION OF THE DRAWINGS

FIG. 9 is a rear elevational view of the case of FIG. 6.

FIG. 10 is a bottom view of the case of FIG. 6.

FIG. 11 is a plan view of the case of FIG. 6.

DESCRIPTION OF THE PREFERRED EMBODIMENTS

Figure 1:
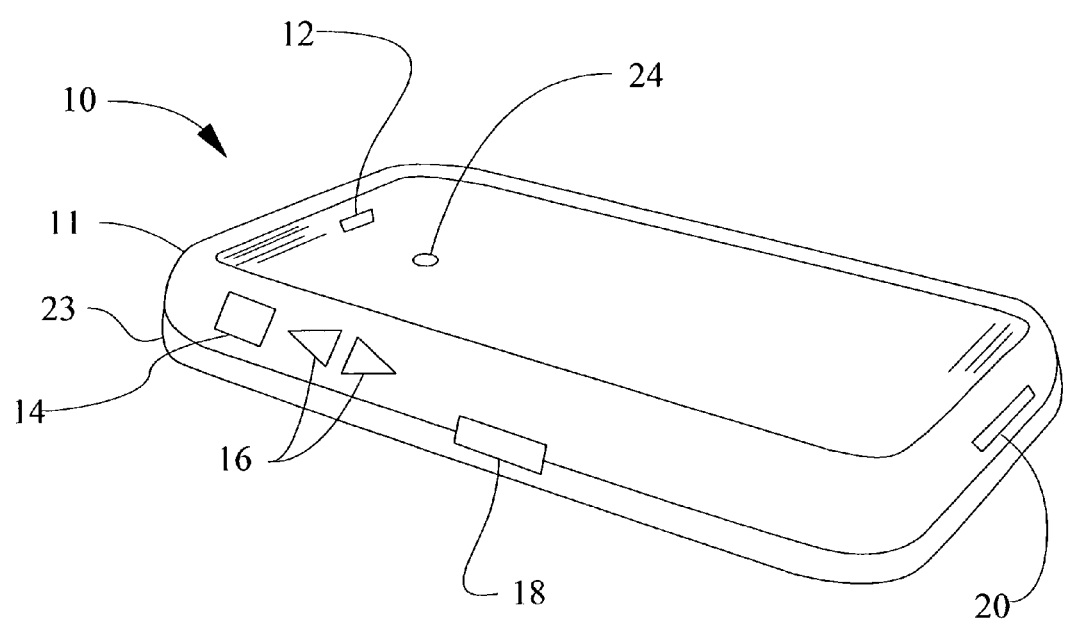
FIG. 1 is a top left perspective view of the cellular phone case according to the present invention.
Figure 2:
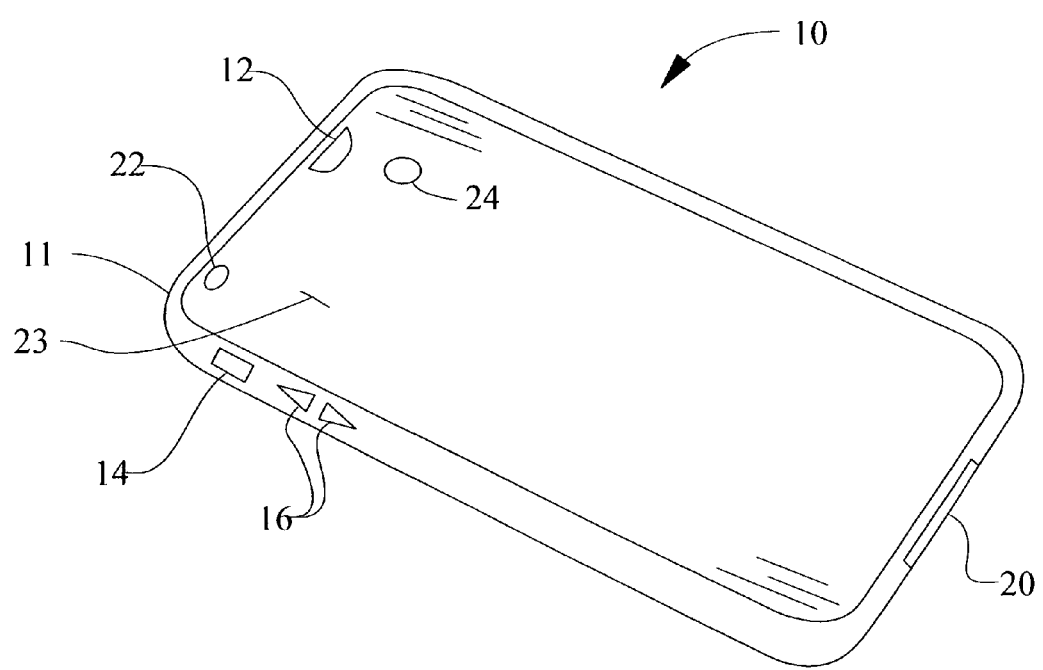
FIG. 2 is a top perspective plan view of the cellular phone case of FIG. 1.
Figure 3:
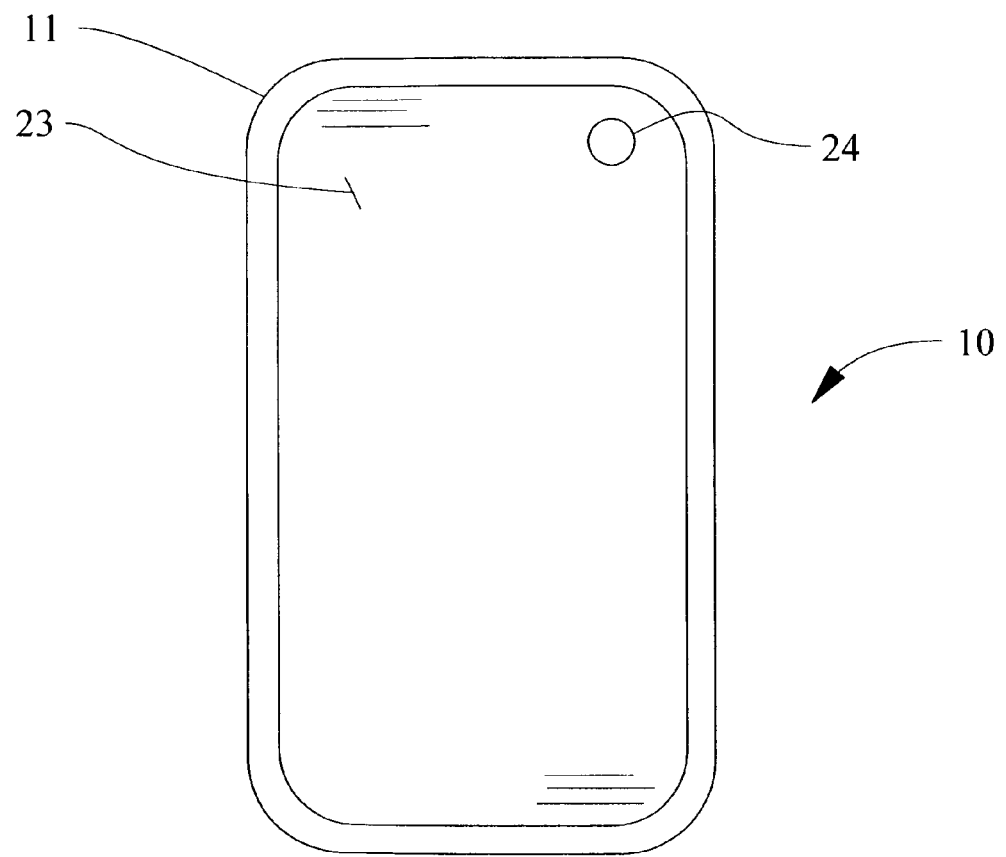
FIG. 3 is a bottom view of the cellular phone case of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A cellular phone case 10 according to one aspect of the present invention is shown in FIGS. 1-5. Case 10 provides a protective case designed for a cellular phone, with an emphasis in marketing towards the Apple® Iphone®. Case 10 provides a storage compartment 30 designed for paper currency, credit cards, ID cards (or similar like items), with an enclosed mirror 26 and locking clasp 18. Clasp 18 secures the upper section and the lower section together, which are joined by hinges 28. Case 10 will be made out of an ABS plastic (flexible grade) with a type of metal hinge(s). The approximate dimension of case 10 will be 5" (127.0000 mm) in length, 2⅞" (72.9996 mm) in depth and 1¼" (31.7500 mm) in height. Locking clasp 18 is ⅜" (9.5250 mm) long. Mirror 26 consists of a plastic substrate or a dielectric coating which will measure approximately 3" (76.2000 mm) in length, 2" (50.8000 mm) in height and 0.060" (1.5 mm) thick.

Referring now to FIGS. 1-5, cellular phone case 10 is shown in a closed state. Upper section 11 includes a power switch opening 12, a silence switch opening 14, a volume access opening 16, a clasp 18 to secure upper section 11 to lower section 23, and a power cord opening 20. Lower section 23 includes a camera lens opening 24. Upper section 11 also includes headphone jack opening 22, viewable in FIG. 2.

Figure 4:
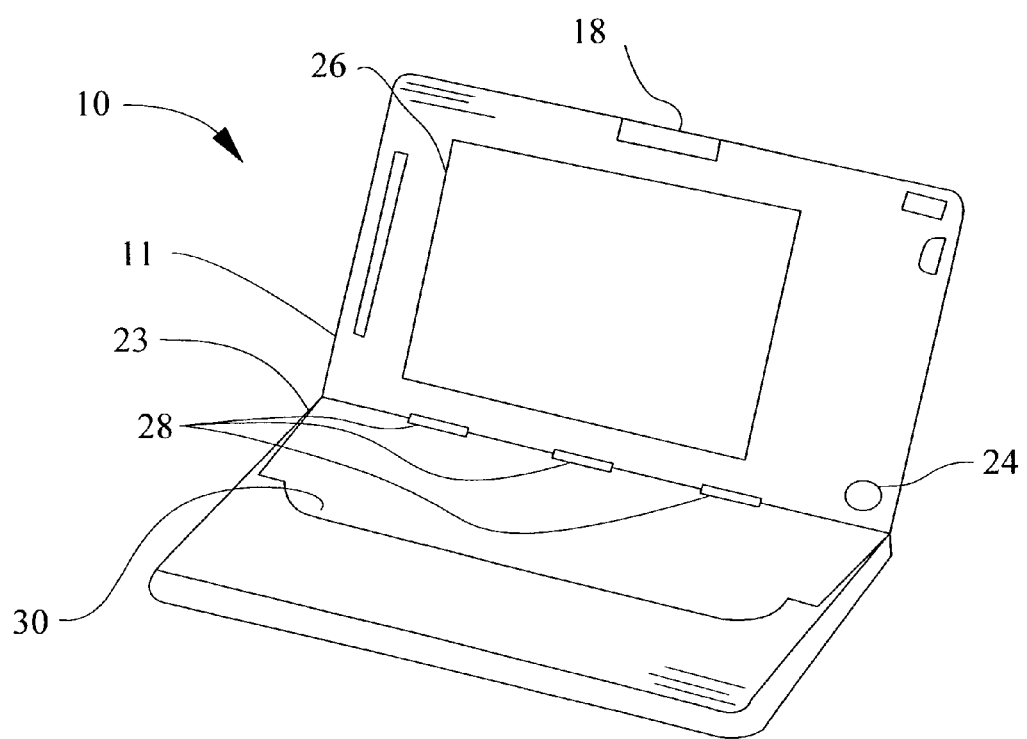
FIG. 4 is a bottom perspective view of the cellular phone case of FIG. 1 with the upper and lower sections opened.
Figure 5:
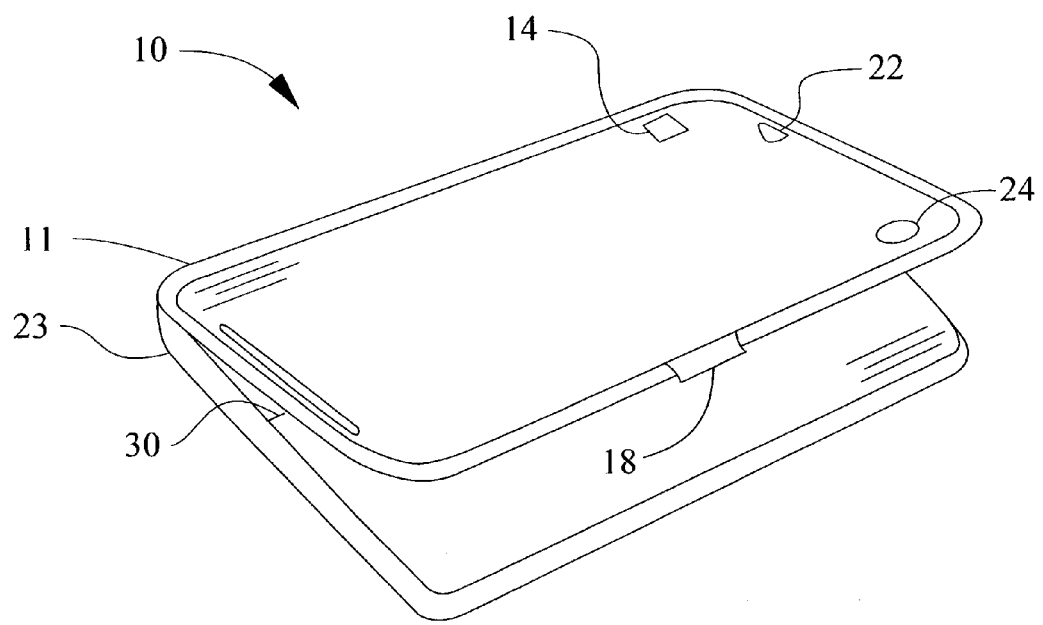
FIG. 5 is a bottom perspective view of the cellular phone case of FIG. 1 with the upper and lower sections partially opened.

FIGS. 4-5 depict cellular phone case 10 in its opened state. Hinges 28, mirror 26 and storage compartment or pocket 30 are depicted in FIG. 4. Money, credit cards and cash are contemplated as readily stored in storage compartment 30.

Figure 6:
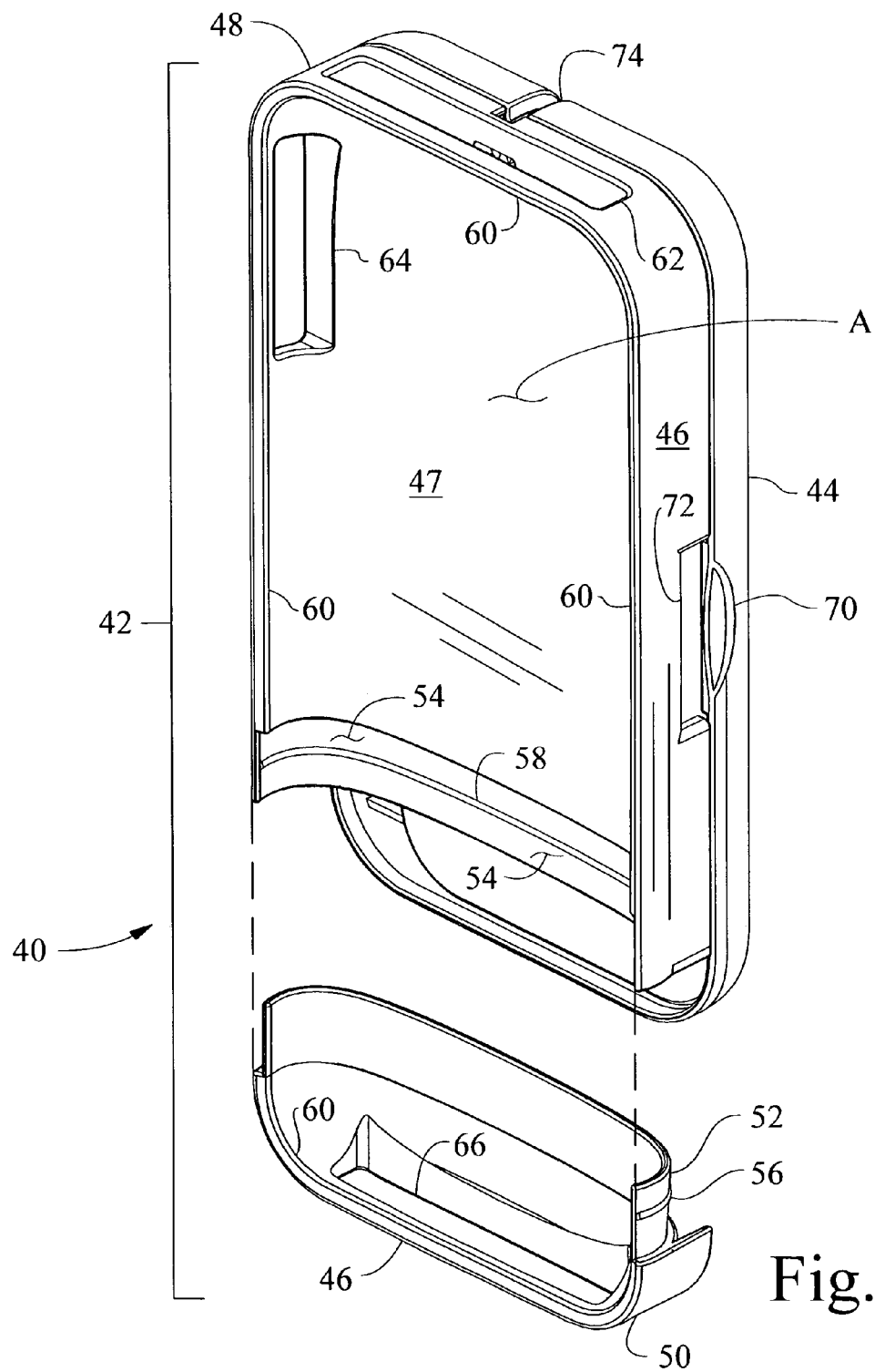
FIG. 6 is a front perspective view of another cell phone case according to the present invention.

Referring now to FIG. 6 a front perspective view of another cell phone case 40 according to the present invention is shown. Case 40 includes a cell phone compartment 42 and a storage compartment door 44 that are attached to one another via hinges (shown in FIG. 7). Phone compartment 42 is dimensionally sized to receive a cell phone in the space designated "A" and defined by side walls 46 and back wall 47 which together comprise upper compartment 48. Phone compartment 42 consists of an upper compartment portion 48 and a removable compartment portion 50 that are removably attached to one another via a mechanical interface consisting of curved flange 52 and mating slot 54 formed in upper compartment 48. Flange 52 includes a protruding rib 56 that engages a mating groove 58 when flange 52 is inserted into slot 54 thereby joining the two to retain a cell phone (not shown) in the area designated "A". Walls 46 include an inwardly oriented taper towards opposing walls at 60 and surrounding the area "A". The taper at 60 serves to positively retain a cell phone in area "A" after a cell phone has been inserted from below into upper compartment 48 and removable portion 50 is mechanically attached to portion 48 via the mechanical engagement of flange 52 and slot 54.

Compartment 42 includes a substantially planar rectangular member or back wall 47 conforming in size to the height and width dimensions of a cell phone housing that is positionable within compartment 42. Thin resilient retaining walls 46 extend substantially perpendicularly from each edge of planar rectangular member or wall 47. Walls 46 extend or taper inwardly over rectangular back wall 47 at a distance corresponding to the depth or thickness of a cell phone case. Resilient retaining walls 46 maintain or grip a cell phone in position when the cell phone is situated between resilient retaining walls 46 and adjacent back wall 47.

Walls 46 also include a number of apertures therein providing access to cell phone connectors and control input buttons of a cell phone when the cell phone is situated at "A". Aperture 62 provides access to the headphone jack, SIM card slot and on/off/sleep/wake button of an iPhone® cell phone. Aperture 64 enables physical access to a ring/silent switch and volume buttons of an iPhone® phone. Aperture 66 enables access to a dock connector of the iPhone® phone.

Storage compartment door 44 includes a notch 70 and a mating notch 72 in compartment 42 enable the user to physically separate door 44 and compartment 42 to gain access to the interior of the space defined between door 44 and cell phone compartment 42. A notch at 74 provides access to an aperture for attachment of a wrist strap.

Figure 7:
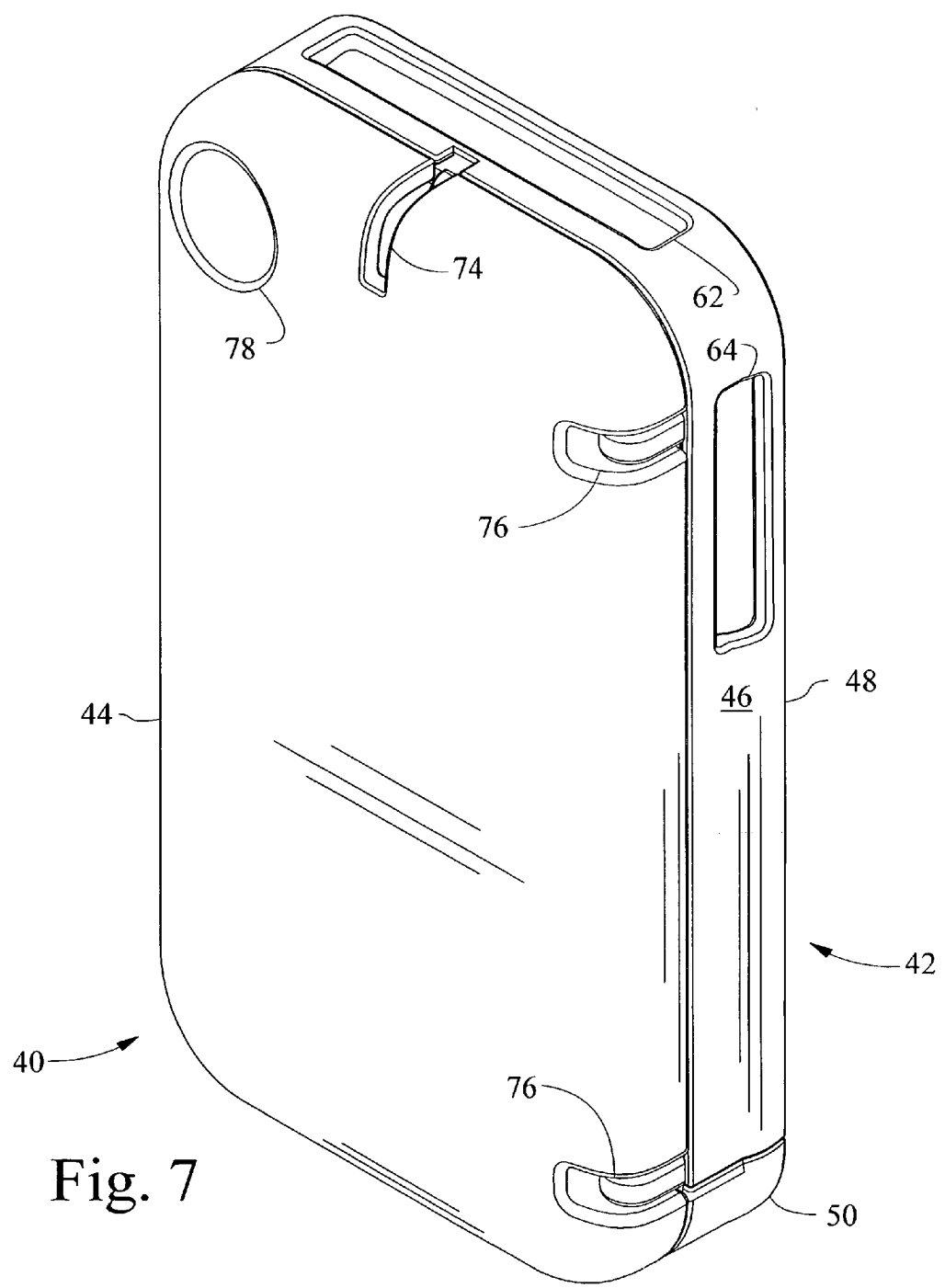
FIG. 7 is a rear perspective view of the case of FIG. 6.

Referring now to FIG. 7, a rear perspective view of cell phone case 40 is shown. In this view, lower portion 50 and upper portion 48 are attached to form cell phone compartment 42. Hinges 76 are comprised of component parts integrally formed in compartment portion 48 and door 44 and are visible in this view. Hinges 76 include arms and mating pins in door 44 (see FIGS. 15 and 16 for more detail on hinges 76).

Aperture 78 provides a porthole to a camera lens enabling pictures to be taken with the built-in camera of an iPhone® phone. Also shown in FIG. 7 are notch 74, apertures 62 and 64, upper compartment portion 48, walls 46 and removable portion 50.

Figure 8:
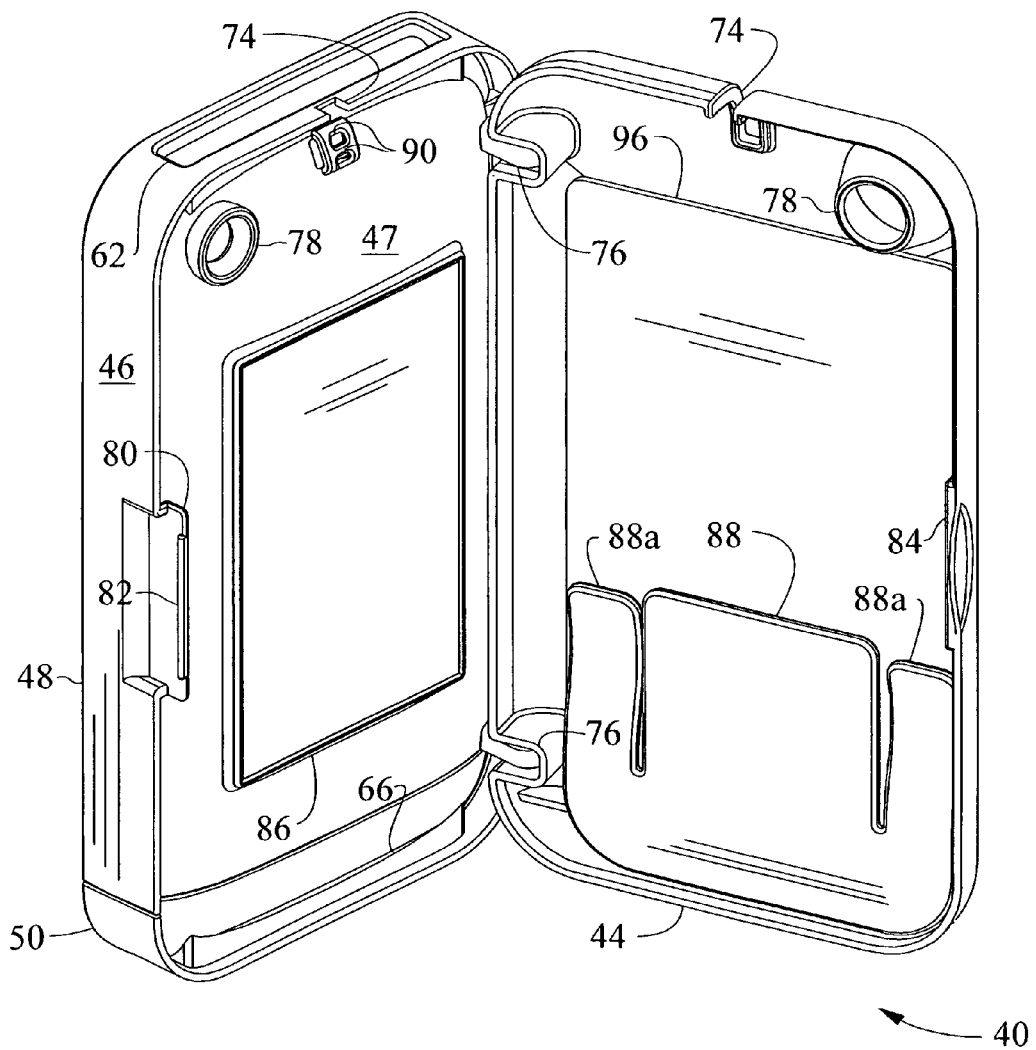
FIG. 8 is a perspective view of the case of FIG. 6 with the storage compartment disposed in an open position.

Referring now to FIG. 8, a rear perspective view of case 40 is shown with the storage compartment door 44 in an open position. Latch 80 is integrally formed in upper compartment 48 and includes a locking rib 82. A groove 84 is formed in door 44 that mates with rib 82 and provides a door locking mechanism in conjunction with rib 82. Mirror 86 is permanently attached to wall 47 as shown. Resilient clip 88 is attached to door 44 within the storage compartment and provides a means for securely maintaining paper money, ID cards, credit cards and the like between clip 88 and door 44. Wall insert 96 is attached to door 44 as shown. Clip 88 includes resilient curved portions 88a situated in close proximity to rectangular wall insert 96. Curved portions 88a exert a retaining force toward planar wall insert 96 when cash or currency are situated between curved portions 88a and wall insert 96. Camera aperture 78 extends through both door 44 and wall 47 to allow images to be captured by a cell phone situated between walls 46. Apertures 90 are situated within notch 74 for receiving a thin strap or cord attached to a wrist strap (shown in FIG. 14). Additional detail regarding the components of hinges 76 is shown in FIG. 8. Removable portion 50, aperture 62 and aperture 66 are also shown.

Referring now to FIG. 9, a rear elevational view of case 40 is shown. Door 44 is shown including aperture 78 therethrough. A rear view of hinges 76 is shown. Notch 74 and wrist band mounting apertures 90 are also viewable from this viewpoint.

Referring now to FIG. 10, a bottom view of case 40 is shown. Docking connector aperture 66 extends through walls 46 formed in removable portion 50. Storage compartment door 44 is also shown. The contour of walls 46 is more readily seen at 46a where the inward taper 60 of walls 46 towards opposing walls 46 is readily seen.

Referring now to FIG. 11, a plan view of case 40 is shown. Walls 46 include a slight bulge at 46a that provides a tactile and more convenient gripping surface for the user of case 40. Aperture 62 in wall 46 provides access to a docking connector as well as exposing the microphone and speaker of the iPhone® cell phone to external acoustics. Camera aperture 78 is visible in compartment door 44. Notch 74 formed in door 44 and apertures 90 are also shown.

Figure 12:
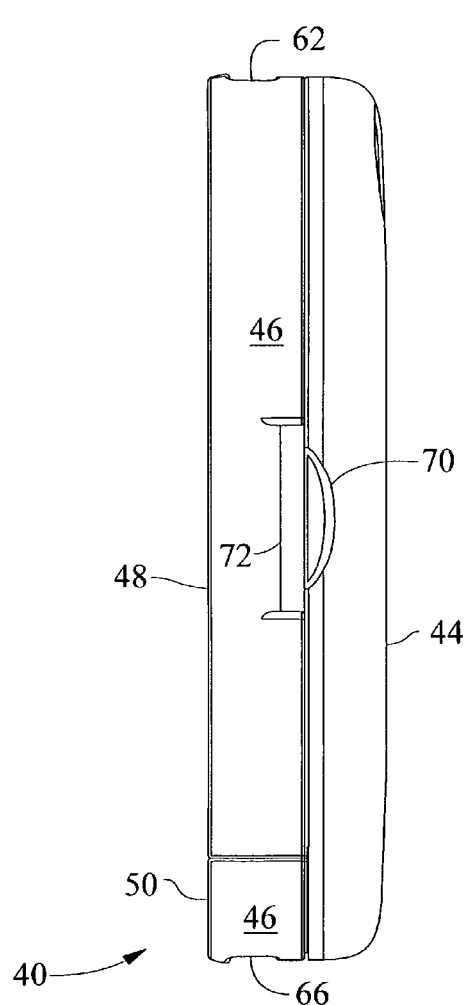
FIG. 12 is a right side elevational view of the case of FIG. 6.

Referring now to FIG. 12, a right side elevational view of case 40 is shown. Upper portion 48, lower portion 50, apertures 62 and 66 are shown. Thumb notch 72 formed in wall 46 and notch 70 formed in door 44 are depicted. A user applies thumb force pressure at notches 72 and 70 to release latch 80 (not shown) and pry open storage compartment door 44.

Figure 13:
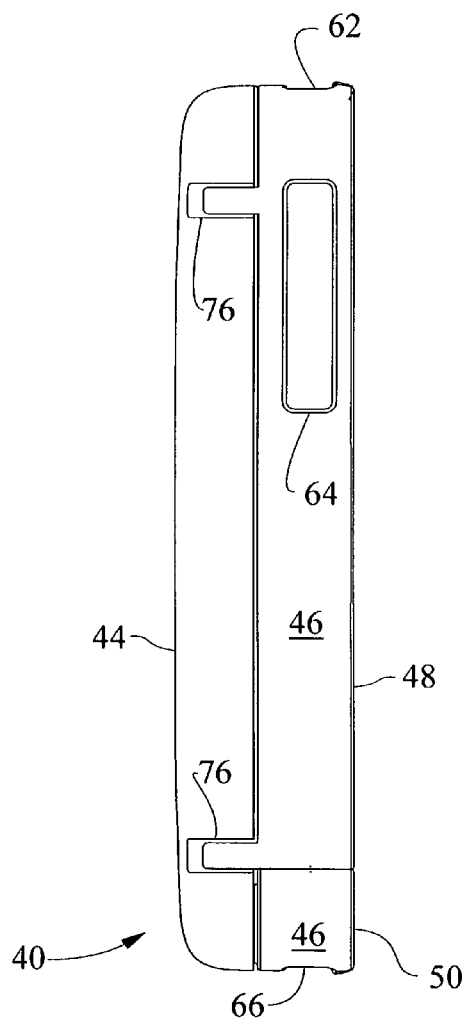
FIG. 13 is a left side elevational view of the case of FIG. 6.

Referring now to FIG. 13, a left side elevational view of case 40 is shown. Hinges 76 formed partially in door 44 and partially in upper portion 48 are shown. Lower portion 50, walls 46, and apertures 62, 64 and 66 are also visible from this perspective.

Figure 14:
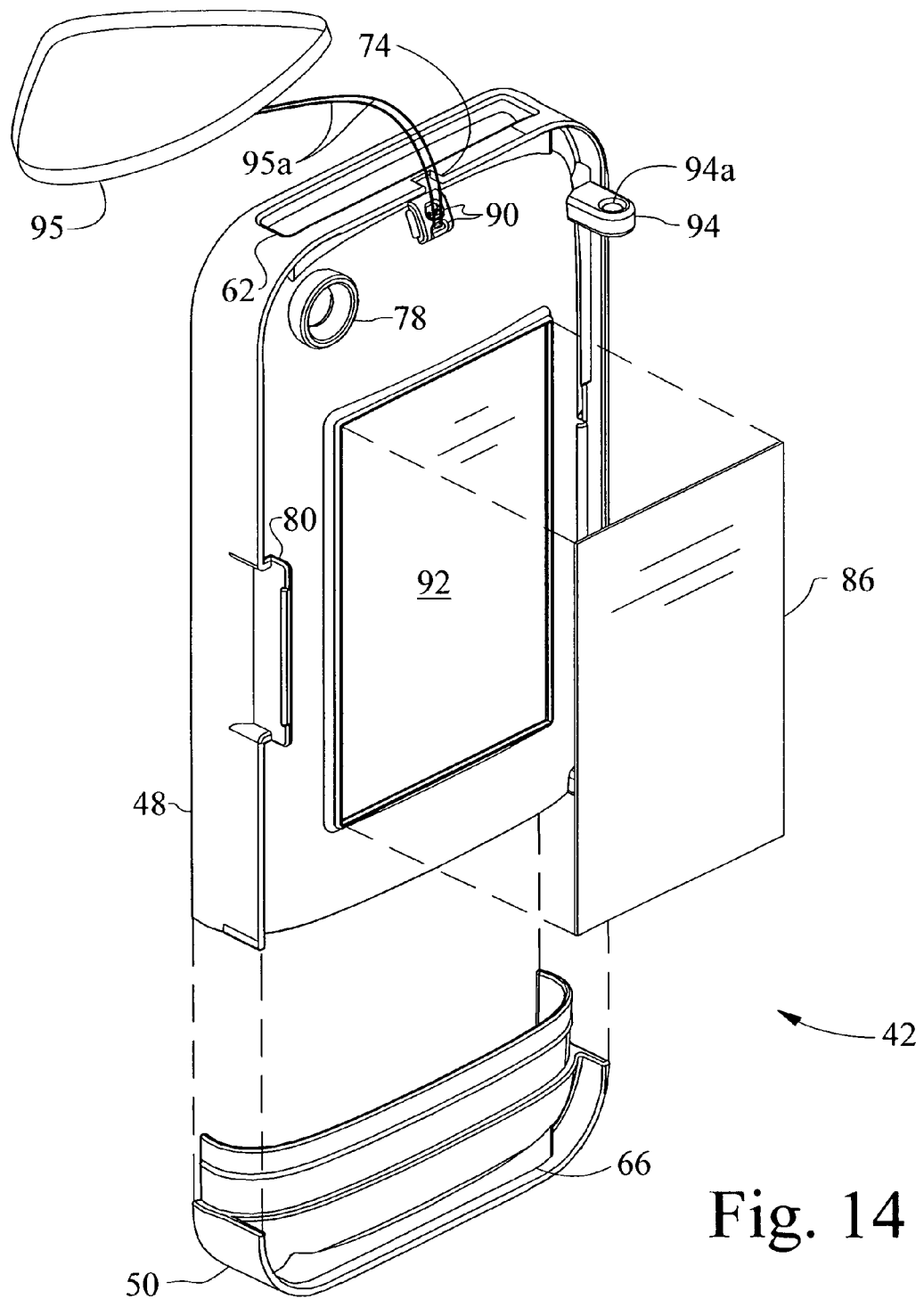
FIG. 14 is an exploded perspective view of the case of FIG. 6 with the storage compartment door removed.

Referring now to FIG. 14, an exploded rear perspective view of phone compartment 42 is shown. Mirror 86 is shown apart from upper compartment 48 and revealing a mirror mounting location 92 dimensionally sized and shaped to receive a flat mirror therein. Mirror 86 is attached to location 92 using an adhesive. Removable compartment 50 is shown detached from upper compartment 48 with broken lines indicating the direction taken for assembly of compartment 50 to compartment 48. Hinge 76, discussed above, includes hinge arm 94 and circular hinge pin indentation 94a formed therein and designed to receive a mating hinge pin (shown in FIG. 15). Wrist strap 95 includes cords or straps 95a extending therefrom and attached to upper compartment 48 by looping the cords 95a through apertures 90. Also shown in FIG. 14 are camera aperture 78, latch 80, aperture 62, notch 74, and aperture 66.

Figure 15:
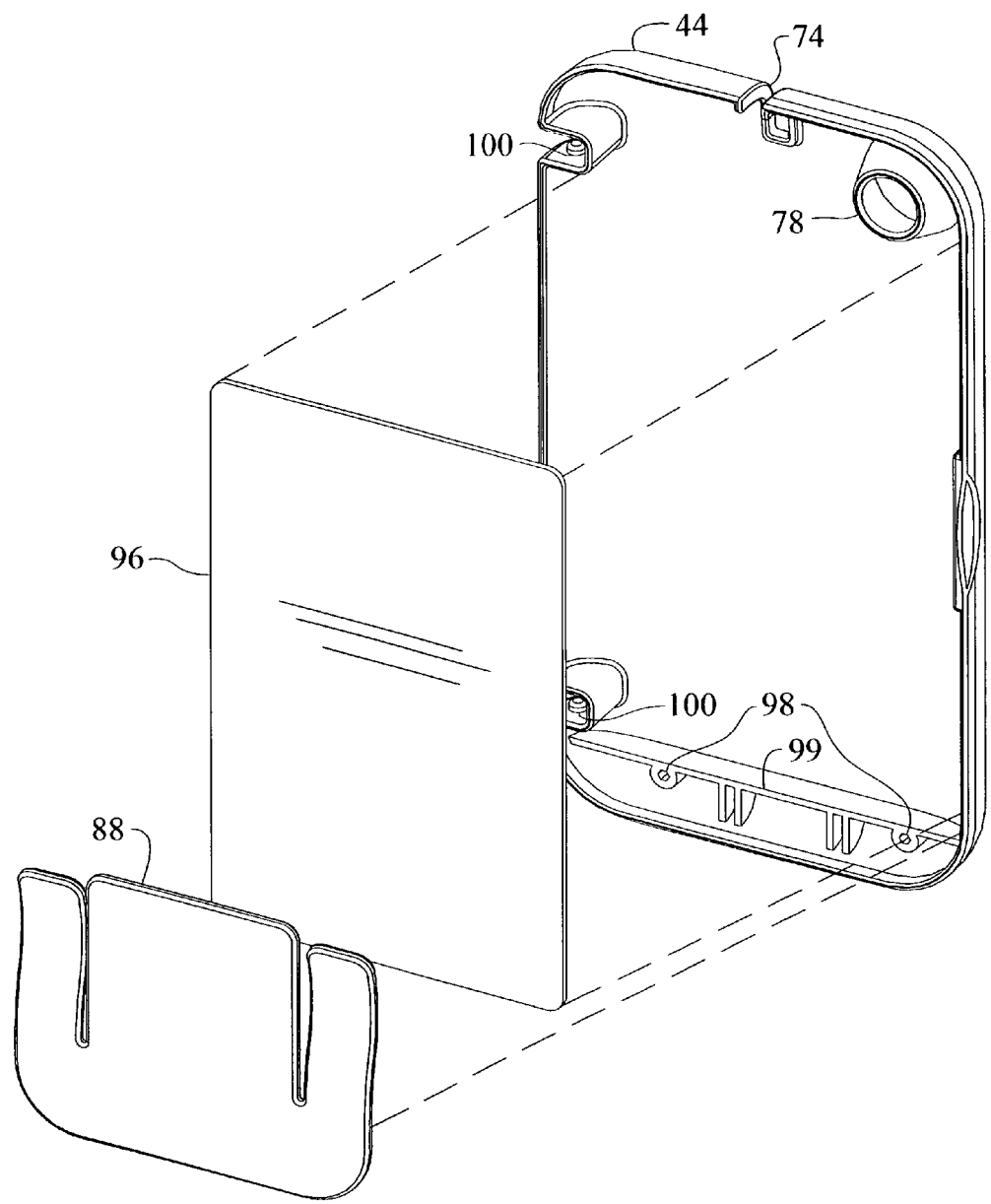
FIG. 15 is an exploded perspective view of the storage compartment door of the case of FIG. 6.

Referring now to FIG. 15, an exploded perspective view of storage compartment door 44 is shown. Planar rectangular wall insert 96 is attached using adhesive or by ultrasonic weld to door 44 as shown, though it is also contemplated that wall 96 may be integrally formed in door 44. Resilient clip 88 is then attached in similar fashion to door 44 in position over wall insert 96. Locating pins (not shown) integrally formed in the back surface of clip 88 mate with and engage apertures 98 in support rib 99. Hinge pins 100 engage pin indentations 94a (see FIG. 14) thereby comprising the working components of hinge 76. Camera aperture 78 and notch 74 are also shown. Currency, credit cards and identification cards are handily stored in between resilient clip 88 and wall insert 96.

Operationally speaking, cell phone case 40 provides a convenient storage compartment for carrying paper currency, ID cards and credit cards secured underneath a resilient clip 88. The users cell phone is easily inserted into upper compartment 48 and securely retained therein when removable compartment 50 is attached to compartment 48. Mirror 86 addresses the needs of those who need a quick glance at their appearance. It should be apparent that the location of mirror and resilient clip may be reversed, that is, mirror 86 could be attached to storage compartment door 44 and clip 88 could be attached to phone compartment 42 in any number of locations. It is also contemplated that multiple smaller resilient retaining clips may be included in the cases disclosed above. Other object holding devices are also contemplated as being situated in the storage compartment of the cases shown above, such as coin holders, spring loaded clips, narrow overlapping slots integrally molded into the storage compartment doors for receiving and retaining ID cards or credit cards, or a simple double-sided adhesive strip for depositing loose articles in the storage compartment. Ear bud retaining devices may also be molded into door 44 or the back side of compartment 42 for convenient storage thereof. Overlapping slotted credit card holders such as are found in a common leather wallet may be substituted in place of or added in addition to resilient clip 88. Such devices may be hingedly attached to storage compartment door 44. Resilient clip 88 may be formed of plastic or this sheet metal.

The disclosed cell phone cases and component parts are preferably constructed of a moldable resilient thermoplastic material of which many such plastics are well known, including but not limited to polyethylene, polypropylene, ABS (acrylonitrile butadiene styrene), polycarbonates, PVC (polyvinyl chloride) and others well known in the art of thermoplastics. Mirror 86 is constructed of glass, plastic or suitable substitutes. Plastic materials or paint with a "rubberized" texture or feel providing a good gripping surface may be desirable and used with the cases shown above.

The configuration of the cell phone cases shown above are generally intended for use with an iPhone® cell phone though it should be readily apparent that repositioning of the apertures and dimensionally resizing cell phone compartment 42 would accommodate most any cell phone of similar design features, namely buttons and connectors about the periphery of the phone and a touch-screen user interface on the front side of the phone. Slight modifications to dimensions and aperture locations results in functionally equivalent cases for other cell phones including the recently introduced "smart phones" such as the Motorola Droid® cell phone family, and other smart phones produced by manufacturers such as LG, Samsung, Blackberry, HTC and the like.

An alternate approach contemplated for attachment of lower portion 50 to upper portion 48 to form cell phone compartment 42 includes the use of a hinge attached to both components 48 and 50 and a latching mechanism that may be comprised of a portion of flange 52 and mating slot 54. The hinge would be attached along the narrow mating edge between portions 48 and 50 corresponding to the peripheral sides of cell phone compartment 42.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A cell phone case for use with a cell phone having a display, a substantially rectangular housing having a height, width and depth, and a plurality of buttons and connectors situated about the periphery of the housing, said cell phone case comprising:
   a substantially planar rectangular member conforming in size to the height and width dimensions of the cell phone housing, said rectangular member including resilient retaining walls extending substantially perpendicularly from each edge of said rectangular member and extending inwardly over said rectangular member at a distance corresponding to the depth of the cell phone case and wherein said resilient retaining walls grip the cell phone in position when the cell phone is situated between the resilient retaining walls, said retaining walls including a plurality of apertures therein enabling access to the plurality of buttons and connectors of the cell phone when the cell phone is situated within said resilient retaining walls;
   a hinge attached to said rectangular member;
   a five-sided rectangular box having an open side and attached to said hinge so that said open side of said box is disposed toward said rectangular member, said box being pivotable on said hinge with respect to said rectangular member, said rectangular box defining a storage compartment with said rectangular member;
   a mirror disposed within said storage compartment; and
   retention means situated within said storage compartment for gripping and retaining cash, credit cards, business cards and ID cards therein.

2. The device of claim 1 wherein said planar rectangular member is comprised of a first rectangular portion, a second rectangular portion and means for removably attaching said first rectangular portion to said second rectangular portion, and wherein said resilient retaining walls include a break therein along the mating surfaces between said first rectangular portion and said second rectangular portion.

3. The device of claim 2 including:
   at least two strap attachment apertures situated in said planar rectangular member; and
   a wrist strap attached through said strap attachment apertures.

4. The device of claim 2 wherein said planar rectangular member, said retaining walls, said retaining walls, said hinge and said five-sided rectangular box are constructed from plastic material.

5. The device of claim 4 including latch means situated partially on said rectangular planar member and partially on said five-sided box, said latch means providing a locking mechanism for maintaining said five-sided box adjacent said rectangular member when pivotably positioned on said hinge adjacent one another.

6. A cell phone case for use with a cell phone having a display and a substantially rectangular housing having a height, width and depth, the cell phone further including a plurality of buttons and connectors situated about the periphery of the housing, said cell phone case comprising:
   a substantially rectangular hollow box having six sides wherein the largest two sides of said box dimensionally correspond in size with the height and width of the cell phone and wherein one of the two largest sides of said box is pivotally attached and movable between an open and a closed position;
   cell phone holding means for attaching said hollow box to the cell phone so that the display of the cell phone is fully accessible and viewable by a user, said cell phone holding means attached to said rectangular box and including planar resilient walls extending perpendicularly outward from all edges of one of the largest two sides of said box, said walls tapering inward slightly at a distance corresponding to the depth of the cell phone leaving the display of the cell phone fully viewable and accessible to the user, and wherein said planar resilient walls include a plurality of apertures therein enabling access to the plurality of buttons and connectors about the periphery of the cell phone;
   a mirror attached to the interior of said rectangular hollow box; and
   retention means for gripping cash and small planar items in a secure fashion, said retention means being attached to and disposed within said hollow box.

7. The device of claim 6 wherein at least one of said planar resilient walls is removably attached to said cell phone holding means so that the cell phone may be easily situated within said resilient walls.

8. The device of claim 7 including at least two strap apertures in said hollow box; and
   a wrist strap having an flexible cord attached thereto, and wherein said flexible cord is looped through said strap apertures thereby attaching said wrist strap to said hollow box.

9. The device of claim 8 including latch means attached to said hollow box for providing a holding force to said pivotally attached side of said hollow box when said pivotally attached side is in a closed position.

10. The device of claim 9 wherein said hollow box and said cell phone holding means are constructed of plastic material.

11. A cell phone case for use with a cell phone having a touch screen display and a substantially rectangular housing having a front, back and peripheral edge, and wherein the cell phone includes a plurality of buttons and connectors situated about the periphery of the housing, said cell phone case comprising:
   a substantially rectangular planar member sized to correspond with the back of the cell phone, said planar member including a top surface, a bottom surface and a perimeter;
   a plurality of thin resilient walls attached about the perimeter of said planar member and extending perpendicularly above the top surface of said planar member, said thin resilient walls forming a rectangular box with said planar member for receiving the cell phone therein, and wherein said resilient walls include a plurality of apertures therein situated over the plurality of buttons and connectors of the cell phone when the cell phone is disposed within the resilient walls;
   means for gripping a cell phone situated at the distal ends of said plurality of resilient walls and extending inwardly over said rectangular planar member, said means for gripping being permanently attached to said plurality of resilient walls;
   a hinge attached to said rectangular planar member;
   a five-sided rectangular box having an open side and attached to said hinge so that said open side of said box is disposed toward said rectangular planar member, said box being pivotable on said hinge with respect to said rectangular planar member, said rectangular box defining a storage compartment with said rectangular planar member when situated adjacent said planar member;
   a mirror attached to and disposed within said storage compartment; and
   clip means disposed within said storage compartment and attached thereto for securely gripping cash, credit cards, business cards and ID cards in said storage compartment.

12. The device of claim 11 wherein at least one of said thin resilient walls is removably attached to said planar member.

13. The device of claim 12 including latch means situated partially on said planar member and partially on said five sided box for providing a holding force to said planar member and said five sided box when said planar member and said box are pivotally situated in close proximity to each other.

14. The device of claim 13 wherein said five sided rectangular box, said planar member and said resilient walls are constructed of plastic materials.

15. The device of claim 14 wherein said box includes at least two wrist strap apertures, said device further including a wrist strap attached to said box through said wrist strap apertures.

* * * * *